(12) United States Patent
Kweon et al.

(10) Patent No.: US 12,120,601 B2
(45) Date of Patent: Oct. 15, 2024

(54) METHOD AND DEVICE FOR DISCOVERING AND SELECTING NETWORK FOR PROVISIONING UE SUBSCRIBER DATA

(71) Applicant: Samsung Electronics Co., Ltd., Suwon-si (KR)

(72) Inventors: Kisuk Kweon, Suwon-si (KR); Sangjun Moon, Suwon-si (KR); Jungshin Park, Suwon-si (KR); Youngkyo Baek, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/303,132

(22) Filed: May 20, 2021

(65) Prior Publication Data

US 2021/0368433 A1    Nov. 25, 2021

(30) Foreign Application Priority Data

May 21, 2020   (KR) .......................... 10-2020-0061213

(51) Int. Cl.
*H04W 48/18* (2009.01)
*H04W 8/08* (2009.01)
(Continued)

(52) U.S. Cl.
CPC ............. *H04W 48/18* (2013.01); *H04W 8/08* (2013.01); *H04W 8/265* (2013.01);
(Continued)

(58) Field of Classification Search
CPC . H04W 12/068; H04W 12/069; H04W 12/35; H04W 12/63; H04W 48/18;
(Continued)

(56) References Cited

U.S. PATENT DOCUMENTS

2015/0092701 A1   4/2015   Horn et al.
2016/0142911 A1*  5/2016   Kreiner ............... H04L 63/0272
                                                            370/328
(Continued)

FOREIGN PATENT DOCUMENTS

WO    2020072657 A1    4/2020
WO    2020081773 A1    4/2020
(Continued)

OTHER PUBLICATIONS

International Search Report and Written Opinion of the International Searching Authority in connection with International Application No. PCT/KR2021/006355 issued Sep. 2, 2021, 9 pages.
(Continued)

*Primary Examiner* — Charles N Appiah
*Assistant Examiner* — Nicole M Louis-Fils

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to an embodiment, a method and apparatus for selecting a serving network by a provisioning server in a wireless communication system comprises receiving, from a user equipment (UE), first stand-alone non-public network (SNPN) information including an identifier (ID) of at least one SNPN received by the UE and second SNPN information including an ID of an SNPN with which the UE is in onboarding process, receiving contractual relationship information related to the UE from a default credential server, and selecting a serving SNPN for the UE based on the first SNPN information, the second SNPN information, and the contractual relationship information.

12 Claims, 4 Drawing Sheets

(51) Int. Cl.
*H04W 8/26* (2009.01)
*H04W 12/06* (2021.01)
*H04W 60/04* (2009.01)
*H04W 76/11* (2018.01)

(52) U.S. Cl.
CPC ......... *H04W 12/068* (2021.01); *H04W 60/04* (2013.01); *H04W 76/11* (2018.02)

(58) Field of Classification Search
CPC ....... H04W 60/04; H04W 76/11; H04W 8/08; H04W 8/265; H04W 84/105
See application file for complete search history.

(56) References Cited

U.S. PATENT DOCUMENTS

| | | | | |
|---|---|---|---|---|
| 2020/0245235 | A1* | 7/2020 | Chun | H04W 48/18 |
| 2020/0267786 | A1* | 8/2020 | Qiao | H04W 4/24 |
| 2020/0314731 | A1* | 10/2020 | Ryu | H04W 64/003 |
| 2021/0092707 | A1* | 3/2021 | Ryu | H04W 76/11 |
| 2021/0400489 | A1* | 12/2021 | Starsinic | H04W 60/04 |
| 2022/0038898 | A1* | 2/2022 | Stojanovski | H04W 60/04 |
| 2022/0060883 | A1* | 2/2022 | Zhu | H04W 72/042 |
| 2022/0201592 | A1* | 6/2022 | Lindheimer | H04W 48/10 |
| 2022/0353798 | A1* | 11/2022 | Yang | H04W 48/16 |
| 2023/0156457 | A1* | 5/2023 | Liu | H04W 60/04 455/418 |
| 2023/0189187 | A1* | 6/2023 | Velev | H04W 48/20 455/435.1 |

FOREIGN PATENT DOCUMENTS

WO  WO-2020250664 A1 * 12/2020 ............ H04W 12/06
WO  WO-2021229474 A1 * 11/2021

OTHER PUBLICATIONS

Intel, "KI #4, Sol #5: Update to remove ENs", SA WG2 Meeting #S2-139e, S2-201xxxx (revision of S2-201xxxx), May 25-28, 2020, E-meeting, 8 pages.
Huawei et al., "New Solution UE onboarding and provisioning for SNPN subscription", 3GPP TSG-WG SA2 Meeting #139E e-meeting, S2-200xxxx (revision of S2-2000645), Elbonia, Apr. 20-24, 2020, 7 pages.
"Notes from Conference Call May 13", KI#1 and question 1 to 6 for KI#4, May 15, 2020, https://www.3gpp.org/ftp/tsg_sa/WG2_Arch/TSGS2_139e_Electronic/Inbox/CCs/pre-SA2%23139E_CC_FS_eNPN, 59 pages.
Supplementary European Search Report dated Sep. 18, 2023, in connection with European Patent Application No. 21808368.1, 11 pages.
3GPP TR 23.700-07 V17.0.0 (Mar. 2021) Technical Report; 3rd Generation Partnership Project; Technical Specification Group Services and System Aspects; Study on enhanced support of Non-Public Networks (NPN) (Release 17); 248 pages.
3GPP TR 23.700-07 V0.3.0 (Jan. 2020) Technical Report; 3rd Generation Partnership Project; Technical Specification Group Services and System Aspects; Study on enhanced support of Non-Public Networks (Release 17); 41 pages.

* cited by examiner

METHOD AND DEVICE FOR DISCOVERING AND SELECTING NETWORK FOR PROVISIONING UE SUBSCRIBER DATA

CROSS-REFERENCE TO RELATED APPLICATION

This application is based on and claims priority under 35 U.S.C. § 119 to Korean Patent Application No. 10-2020-0061213, filed on May 21, 2020, in the Korean Intellectual Property Office, the disclosure of which is herein incorporated by reference in its entirety.

BACKGROUND

1. Field

The disclosure relates to a communication system, and in particular, to a method and apparatus for searching for and selecting a network providing subscriber information for a UE to receive subscriber information in a non-public network (NPN).

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G system considers support for various services as compared with the legacy 4G system. For example, most representative services may include, e.g., enhanced mobile broadband (eMBB), ultra-reliable and low latency communication (URLLC), massive machine-type communication (mMTC), and evolved multimedia broadcast/multicast service (eMBMS). The system providing the URLLC service and the system providing the eMBB service, respectively, may be referred to as a URLLC system and an eMBB system. Further, the terms "service" and "system" may be interchangeably used.

Among them, the URLLC service is a service newly considered in the 5G system unlike in the legacy 4G system and, as compared with the other services, this service requires that ultra-high reliability (e.g., a packet error rate of about 10 to about 5) and low latency (e.g., about 0.5 msec) be met. To meet such strict requirements, the URLLC service may adopt a shorter transmission time interval (TTI) than that of the eMBB service and takes into consideration various operation methods utilizing the same.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

As such, as various services are able to be provided with the development of mobile communication systems, there is required a scheme for efficiently using a Non-Public Network (NPN) to provide various services in places, such as factories, schools, or companies, through their own network.

SUMMARY

According to embodiments, there is provided a method and device for effectively providing services in a wireless communication system.

In accordance with an embodiment, a method for selecting a serving network by a provisioning server in a wireless communication system comprises receiving, from a user equipment (UE), first stand-alone non-public network (SNPN) information including an identifier (ID) of at least one SNPN received by the UE and second SNPN information including an ID of an SNPN with which the UE is in onboarding process, receiving contractual relationship information related to the UE from a default credential server, and selecting a serving SNPN for the UE based on the first SNPN information, the second SNPN information, and the contractual relationship information.

The method may further comprise receiving UE location information and UE type information from the UE.

The method may further comprise transmitting the first SNPN information, the second SNPN information, the UE location information, and the UE type information to the default credential server and receiving, from the default credential server, a list of SNPN candidates that can serve the UE, as determined based on the first SNPN information, the second SNPN information, the UE location information, and the UE type information.

The method may further comprise receiving priority information for the list of the SNPN candidates from the default credential server.

The method may further comprise receiving information regarding a network credential from the serving SNPN and transmitting the information regarding the network credential to the UE.

In accordance with an embodiment, a method for registering a serving network by a UE in a wireless communication system comprises receiving an ID of at least one SNPN, transmitting, to a provisioning server, first SNPN information including the ID of the at least one SNPN and second SNPN information including an ID of an SNPN with which the UE is in onboarding process, receiving information for a serving SNPN selected by the provisioning server from the provisioning server, and registering in the serving SNPN based on the information for the serving SNPN.

The method may further comprise transmitting UE location information and UE type information to the provisioning server.

In accordance with an embodiment, the serving SNPN may be determined based on the first SNPN information, the second SNPN information, and contractual relationship information related to the UE.

In accordance with an embodiment, a provisioning server configured to select a serving network in a wireless communication system comprises a transceiver and a controller configured to receive, from a UE, first SNPN information including an ID of at least one SNPN received by the UE and second SNPN information including an ID of an SNPN with which the UE is in onboarding process, receive contractual relationship information related to the UE from a default credential server; and select the serving SNPN for the UE based on the first SNPN information, the second SNPN information, and the contractual relationship information.

In accordance with an embodiment, a UE configured to register a serving network comprises a transceiver and a controller configured to receive an ID of at least one SNPN, transmit, to a provisioning server, first SNPN information including the ID of the at least one SNPN and second SNPN information including an ID of an SNPN with which the UE is in onboarding process, receive information for a serving SNPN selected by the provisioning server from the provisioning server, and register in the serving SNPN based on the information for the serving SNPN.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
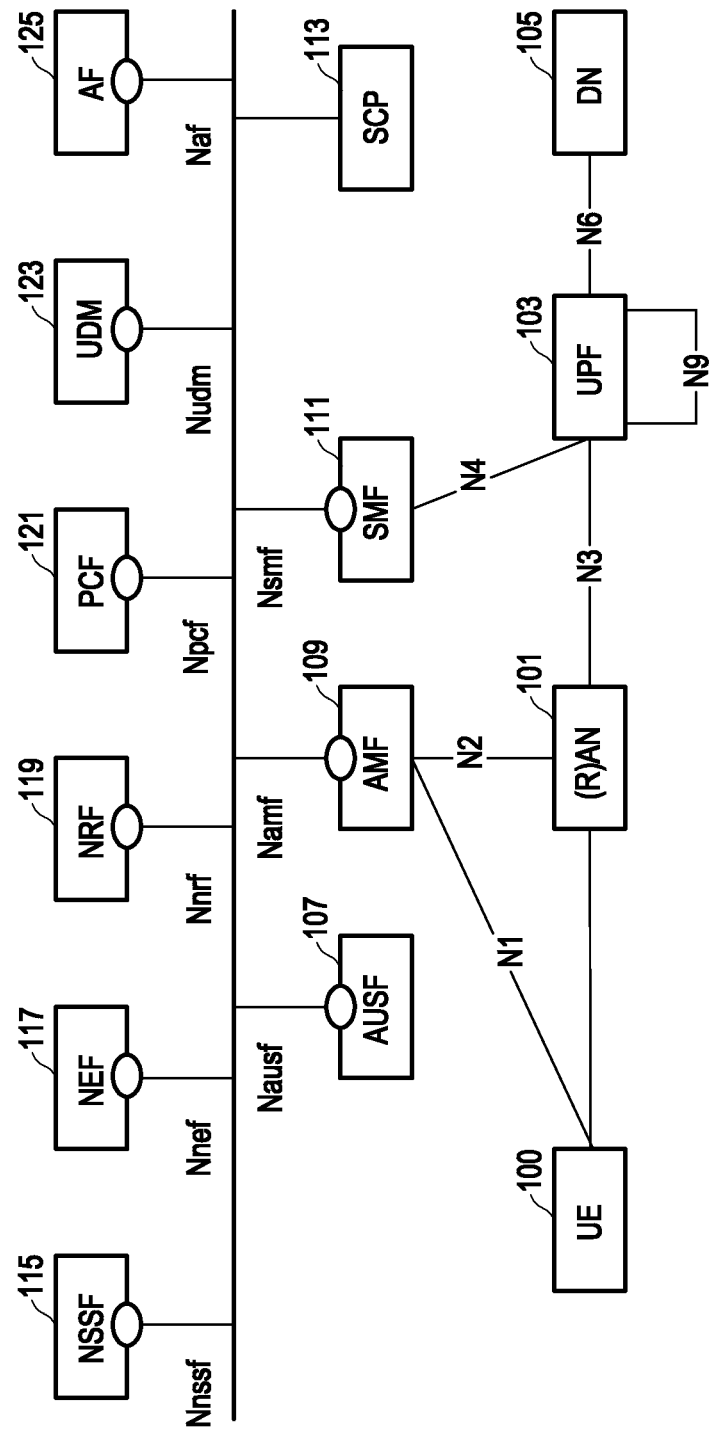
FIG. 1 illustrates a structure of a 5G network according to various embodiments of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings. The same reference denotations may be used to refer to the same or similar elements throughout the specification and the drawings. When making the gist of the disclosure unclear, the detailed description of known functions or configurations is skipped.

In describing the embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be apparent from the embodiments described below with reference to the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or subunits. Further, an element or a 'unit' may be implemented to reproduce one or more CPUs in a device or a security multimedia card.

Hereinafter, the base station may be an entity allocating a resource to the terminal and may be at least one of a NodeB, Node B, base station (BS), eNode B (eNB), gNode B (gNB), radio access unit, base station controller, or node on network.

The terminal may include a user equipment (UE), a mobile station (MS), cellular phone, smartphone, computer, or multimedia system capable of performing communication functions. The embodiments of the disclosure may also apply to other communication systems with similar technical background or channel form. Further, embodiments of the disclosure may be modified in such a range as not to significantly depart from the scope of the disclosure under the determination by one of ordinary skill in the art and such modifications may be applicable to other communication systems.

As used herein, terms for identifying access nodes, terms denoting network entities or network functions (NFs), terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

For ease of description, hereinafter, some of the terms and names defined in the 3rd generation partnership project long term evolution (3GPP LTE) and/or 3GPP new radio (NR) standards may be used. However, the disclosure is not limited by such terms and names and may be likewise applicable to systems conforming to other standards.

Hereinafter, embodiments of the disclosure are described in detail with reference to the accompanying drawings.

FIG. 1 illustrates a structure of a 5G network according to various embodiments of the present disclosure. The network entities or network nodes constituting a 5G network are described below.

Referring to FIG. 1, a wireless communication system constituting a 5G network may include a user equipment (UE) 100 and a plurality of network entities 101 to 125.

The (radio) access network ((R)AN) 101 is an entity that allocates a radio resource to the UE 100 may be at least one of an eNode B, gNode B, Node B, base station (BS), next generation radio access network (NG-RAN), 5G-AN, radio access unit, base station controller, or a node on network.

The UE 100 may be at least one of a terminal, a next generation UE (NG UE), a mobile station (MS), a cellular phone, a smartphone, or a computer. The UE 100 may include a multimedia system capable of performing a communication function.

Although embodiments of the disclosure are described below in connection with a 5G system, the embodiments of the disclosure may also be applicable to other communication systems with a similar technical background. Further, embodiments of the disclosure may be modified in such a range as not to significantly depart from the scope of the disclosure under the determination by one of ordinary skill in the art and such modifications may be applicable to other communication systems.

As evolving from a 4G to 5G system, the wireless communication system defines a new core network, e.g., NextGen core (NG Core) or 5G core network (5GC). In the new core network, the legacy network entities (NEs) all are virtualized into network functions (NFs). According to an embodiment, network function may mean a network entity, network component, or network resource.

According to an embodiment, 5GC may include NFs as illustrated in FIG. 1. Without limitations to the example of FIG. 1, 5GC may include more or less NFs than those shown in FIG. 1.

According to an embodiment, the access and mobility management function (AMF) 109 may be a network function that manages the mobility of the UE.

According to an embodiment, a session management function (SMF) 111 may be a network function that manages a packet data network (PDN) connection provided to the UE. Here, the PDN connection may be referred to as a protocol data unit (PDU) session.

According to an embodiment, the policy control function (PCF) 121 may be a network function that applies a service policy, billing policy, and PDU session policy of the mobile communication service provider to the UE.

According to an embodiment, the unified data management (UDM) 123 may be a network function that stores information about the subscriber.

According to an embodiment, an application function (AF) may be an application function operated by the UE manufacturer, service provider, or PLMN operator. However, the AF may mean an application function that manages the UE's wireless capability and wireless capability ID although the application function is not an application function operated by the UE manufacturer.

According to an embodiment, the service communication proxy (SCP) 113 may act as a proxy server when delivering a 5G core service and relay communication with an appropriate NF to NFs.

According to an embodiment, the network exposure function (NEF) 117 may be a function of providing information about the UE to a server outside the 5G network. The NEF 117 may also provide a function of providing information necessary for a service to the 5G network and storing the function of providing information in a unified data repository (UDR).

According to an embodiment, the user plane function (UPF) 103 may serve as a gateway for transmitting user data (PDU) to a data network (DN) 105.

According to an embodiment, the network repository function (NRF) 119 may perform a function of discovering a network function (NF).

According to an embodiment, the authentication server function (AUSF) 107 may perform authentication on the UE in a 3GPP access network and a non-3GPP access network.

According to an embodiment, the network slice selection function (NSSF) 115 may perform a function of selecting a network slice instance provided to the UE.

According to an embodiment, the data network (DN) 105 may be a data network through which the UE 100 transmits and receives data to use a service of the network operator or a 3rd party service.

Figure 2:
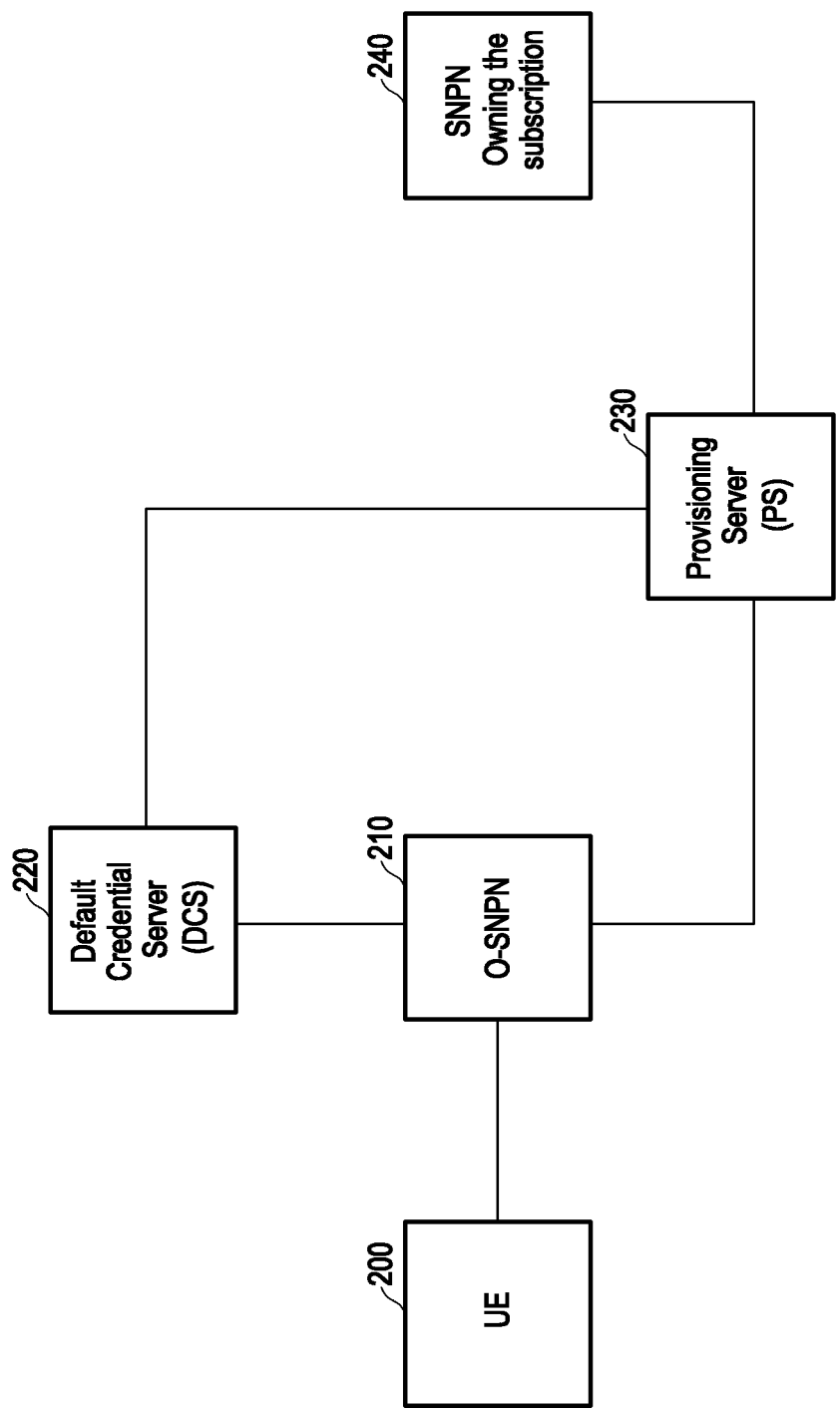
FIG. 2 illustrates entities for transmitting a user subscription to a UE according to various embodiments of the present disclosure.

FIG. 2 illustrates entities for transmitting a user subscription to a UE according to various embodiments of the present disclosure.

Referring to FIG. 2, a wireless communication system for transmitting a user subscription to a UE may include a UE 200, an onboarding stand-alone non-public network (O-SNPN) 210, a default credential server (DCS) 220, a provisioning server (PS) 230, and an SNPN network 240 retaining user subscriber information.

It is assumed that the UE 200 does not have subscriber information (also referred to as user subscription data) and that the UE 200 has default UE credentials allocated by the DCS 220. The DCS 220 may allocate a unique UE identifier that may uniquely identify the UE 200 to the UE.

The O-SNPN 210 may provide a user plane (UP)-based IP connectivity (UE onboarding) or control plane (CP)-based non-access stratum (NAS) connectivity (UE onboarding) to the UE 200 so that the UE 200 which lacks user subscription data may download user subscription data. To determine whether to provide an onboarding service to the UE 200, the DCS 220 may receive a request for UE authentication.

The DCS 220 may pre-configure a default UE credential and a unique UE identifier in the UE 200 and store this information. When performing UE registration for Onboarding from the O-SNPN 210, the DCS 220 may receive a request for authentication for the UE 200. Authentication for the UE 200 is performed using the default UE credential.

Further, when the PS 230 transmits subscriber information to the UE 200, the DCS 220 may receive a request for authentication/authorization for the UE 200 from the PS 230 to determine whether the UE 200 is a UE having the authority for receiving subscriber information. The DCS 220 may be a third party associated with the SNPN network operator or the manufacturer of the UE 200.

The PS 230 may receive user subscriber information, such as network credential and user configuration information, from the network operator and transmit the user subscriber information to the UE 200.

The PS 230, along with the DCS 220, may exist as a server and, like the DCS 220, the PS 230 may be a server owned by a third party associated with the SNPN network operator or the manufacturer of the UE. The PS 230 may communicate with the DCS 220 for authentication/authorization of the UE 200.

The SNPN network 240 owning the user subscriber information may transmit the user subscriber information to the UE 200 through the PS 230. In this case, the network operator may have UE identifier information for UEs to provide user subscriber information.

Figure 3:
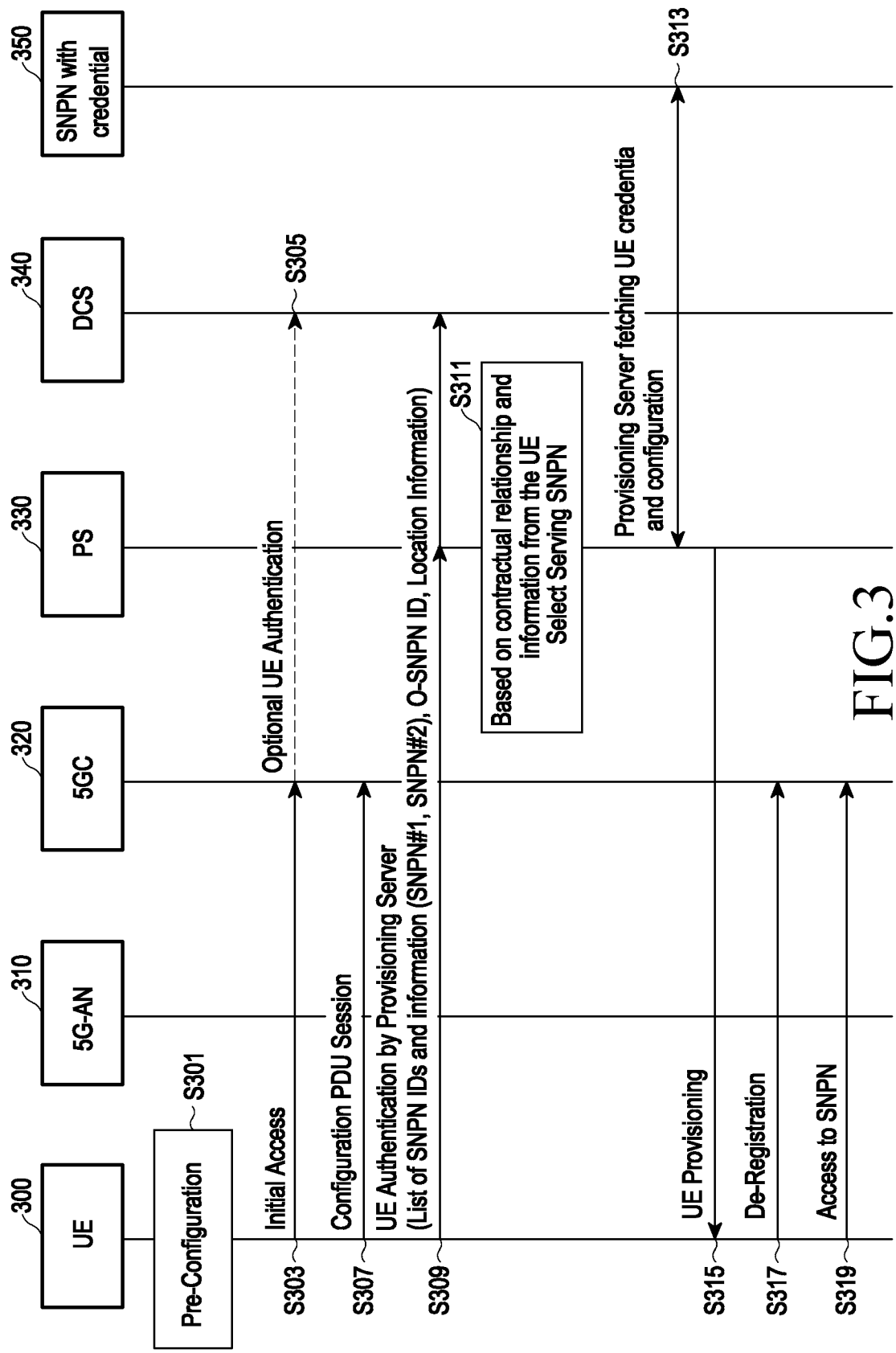
FIG. 3 illustrates a procedure for UE onboarding for a UE to receive user subscriber information according to various embodiments of the present disclosure.

FIG. 3 illustrates a procedure for UE onboarding for a UE to receive user subscriber information according to various embodiments of the present disclosure.

Referring to FIG. 3, a wireless communication system performing a UE onboarding procedure include a UE 300, a 5G access network (5G-AN) 310, a 5G core network (5GC) 320, a provisioning server (PS) 330, a DCS 340, and a serving network 350.

The 5G-AN 310 allocates a radio resource for the UE 300 and transmits system information to the UE 300. The 5GC 320 may be implemented as an SNPN, and the serving network 350 may be implemented as a network (NPN or PLMN) that retains user subscriber information (e.g., network credential and configuration information).

In operation S301, the UE 300 pre-configures the default UE credential and the unique UE identity assigned from the DCS 340. In this case, the default UE credential is configured in the UE 300, but no network credential is configured. A network credential may be provided to the UE 300 as part of an onboarding procedure.

According to an embodiment, if there is an agreement between the manufacturer of the UE and the SNPN network, the UE 300 may retain an initial default configuration (e.g., PLMN ID and NIF of the SNPN, S-NSSAI, or DNN).

In operation S303, upon initial access, the UE 300 may search for and select an onboarding SNPN (O-SNPN) based on the received broadcast system information. In this case, the onboarding SNPN (O-SNPN)) need not necessarily be the same as the SNPN having the network credential.

Since the UE 300 lacks subscriber information for the corresponding SNPN 320, the UE 300 may transmit the unique UE identity and default UE credential of the UE 300 to the SNPN 320 upon initial access. The UE 300 may transmit additional information, such as an application identifier or a service provider identifier, to the SNPN 320.

In operation S305, the SNPN 320 transmits the unique UE identity and default UE credential of the UE 300 to the DCS 340 that manages the UE 300, thereby requesting authentication as to whether the UE 300 may access the network for onboarding purposes. The authentication may be performed by selecting either primary authentication or network slice specific authentication and authorization (NSSAA).

In operation S307, the UE 300 creates a configuration PDU session. The PDU session is created using well-known or pre-configured S-NSSAI/DNN information or 5-NSSAI/DNN information received from the DCS 340. To that end, the AMF selects a designated SMF, and the SMF also selects a designated PDU session anchor (PSA) UPF.

In operation S309, the UE 300 may access the PS 330 using the information pre-configured in the UE 300 at the application level or the application identifier or service provider identifier. The PS 330 may transmit the unique UE identifier and default UE credential of the UE 300 to the DCS 340 to authenticate the UE 300.

In operation S309, to select a network (e.g., a serving network) in which the PS 330 owns the user subscriber information to be transmitted to the UE 300, the UE 300 may transmit, to the PS 330, information such as an ID (PLMN ID+NID) list for the SNPN network currently receiving the broadcast system information, relevant information (list of SNPN IDs and information), the ID (O-SNPN ID) of the SNPN network being currently used for onboarding, UE location information, and UE type information. The PS 330 may transmit, to the DCS 340, the information (list of SNPN IDs and information, O-SNPN ID, and location information) received from the UE for selecting the serving network, as well as the UE authentication-related information for authenticating the UE 300.

The DCS 340 may transmit a candidate serving network list to the PS 330 considering, e.g., the SNPN network ID list and onboarding SNPN network ID, UE location information, and UE type transmitted from the UE 300.

According to an embodiment, the DCS 340 may transmit information about the priority for the candidates serving network list together with the candidates serving network list.

According to an embodiment, if there is a network operator who has already been contracted by the manufacturer, the DCS 340 may transmit contractual relationship information to the PS 330.

In operation S311, the PS 330 may select a serving network based on the contractual relationship information received from the DCS 340 and the information received from the UE 300 (e.g., the SNPN network ID list, onboarding SNPN network ID, UE location information, and UE type).

In other words, the PS 330 may select the serving SNPN 350 for the onboarding UE using UE information for selecting the serving SNPN and NW information for selecting the serving SNPN.

According to an embodiment, the PS 330 may receive information about the SNPN from the UE 300. The information about the SNPN may include at least one of RAN information including signal strength and information about cell capacity.

In operation 313, the PS 300 may request the serving network 350 and receive, from the serving network 350, not only network credentials for the future SNPN owning the subscription but also other UE configuration parameters (e.g., PDU session parameters, such as SNSSAI, DNN, URSPs, QoS rules, and other required parameters to access the SNPN and establish a regular PDU session).

In operation S315, the PS 330 may transmit the data received from the serving network 350 in operation S313 to the UE 300.

Upon successfully receiving the data in operation S315, the UE 300 may disconnect the configuration PDU session of the onboarding network 320 and perform deregistration in operation S317.

In operation S319, the UE 300 may receive a network service by registering in the serving network using the received subscriber information. In this case, the onboarding network and the serving network may be the same or different.

Figure 4:
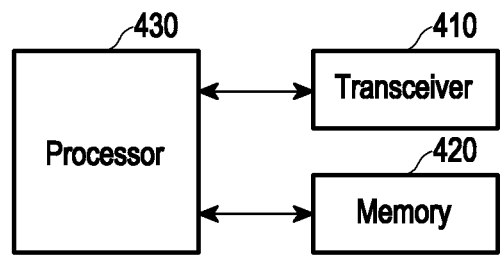
FIG. 4 illustrates a structure of a network entity or server according to various embodiments of the present disclosure.

FIG. 4 illustrates a structure of a network entity or server according to various embodiments of the present disclosure.

Each of the network entities or servers described above with reference to FIGS. 1 to 3 may include the configuration of FIG. 4. For example, the structures of, e.g., the SMF, NEF, and AF may correspond to those described in connection with FIG. 4. For example, the structures of, e.g., the provisioning server (PS) and default credential server (DCS) may correspond to those described in connection with FIG. 4.

Referring to FIG. 4, a network entity or server according to an embodiment may include a transceiver 410, a memory 420, and a processor 430. The transceiver 410, the processor 430, and the memory 420 of the network entity or server may operate according to the above-described communication methods by the network entity or server.

However, the components of the network entity or server are not limited thereto. For example, the network entity or server may include more or fewer components than the above-described components. The transceiver 410, the processor 430, and the memory 420 may be implemented in the form of a single chip. The processor 430 may include one or more processors.

The transceiver 410 collectively refers to a transmitter and a receiver and may transmit and receive signals to/from a base station, a UE, a network entity, or a server. The signals transmitted and received to/from the base station, the UE, the network entity, or the server may include control information and data. To that end, the transceiver 410 may include a radio frequency (RF) transmitter for frequency-up converting and amplifying signals transmitted and an RF receiver for low-noise amplifying signals received and frequency-down converting the frequency of the received signals. However, this is merely an example of the transceiver 410, and the components of the transceiver 410 are not limited to the RF transmitter and the RF receiver.

The transceiver 410 may receive signals via a radio channel, output the signals to the processor 430, and transmit signals output from the processor 430 via a radio channel.

The memory 420 may store programs and data necessary for the operation of the network entity or server. The memory 420 may store control information or data that is included in the signal obtained by the network entity or server. The memory 420 may include a storage medium, such as ROM, RAM, hard disk, CD-ROM, and DVD, or a combination of storage media. Rather than being separately provided, the memory 420 may be embedded in the processor 430.

The processor 430 may control a series of operations to allow the network entity or server to operate as per the above-described embodiments. For example, the processor 430 may receive a control signal and a data signal through the transceiver 410 and process the received control signal and data signal. The processor 430 may transmit the processed control signal and data signal through the transceiver 410. There may be provided a plurality of processors 430. The processor 430 may control the components of the network entity or server by executing a program stored in the memory 420.

Figure 5:
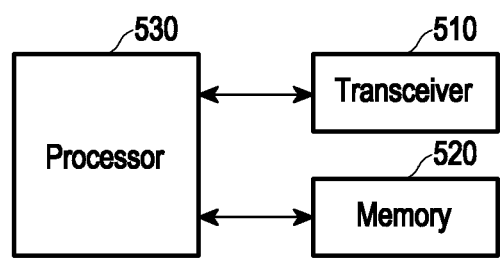
FIG. 5 illustrates a structure of a UE according to various embodiments of the present disclosure.

FIG. 5 illustrates a structure of a UE according to various embodiments of the present disclosure.

The UE described above in connection with FIGS. 1 to 3 may correspond to the UE of FIG. 5. Referring to FIG. 5, the UE may include a transceiver 510, a memory 520, and a processor 530. The transceiver 510, processor 530, and memory 520 of the UE may operate according to the above-described communication methods by the UE. However, the components of the UE are not limited thereto. For example, the UE may include more or fewer components than the above-described components. The transceiver 510, the processor 530, and the memory 520 may be implemented in the form of a single chip. The processor 530 may include one or more processors.

The transceiver 510 collectively refers to a transmitter and a receiver of the UE and may transmit and receive signals to/from a base station, an NF, a server, or another UE. The signals transmitted and received to/from the base station, the NF, the server, or the other UE may include control information and data. To that end, the transceiver 510 may include a radio frequency (RF) transmitter for frequency-up converting and amplifying signals transmitted and an RF receiver for low-noise amplifying signals received and frequency-down converting the frequency of the received signals. However, this is merely an example of the transceiver 510, and the components of the transceiver 510 are not limited to the RF transmitter and the RF receiver.

The transceiver 510 may receive signals via a radio channel, output the signals to the processor 530, and transmit signals output from the processor 530 via a radio channel.

The memory 520 may store programs and data necessary for the operation of the UE. The memory 520 may store control information or data that is included in the signal obtained by the UE. The memory 520 may include a storage medium, such as ROM, RAM, hard disk, CD-ROM, and DVD, or a combination of storage media. Rather than being separately provided, the memory 520 may be embedded in the processor 530.

The processor 530 may control a series of processes for the UE to be able to operate according to the above-described embodiments. For example, the processor 530 may receive a control signal and a data signal through the transceiver 510 and process the received control signal and data signal. The processor 530 may transmit the processed control signal and data signal through the transceiver 510. There may be provided a plurality of processors 530. The processor 530 may control the components of the UE by executing a program stored in the memory 520.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, ROMs, electrically erasable programmable read-only memories (EEPROMs), magnetic disc storage devices, compact-disc ROMs, digital versatile discs (DVDs), or other types of optical storage devices, or magnetic cassettes. Or the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments provided. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

As is apparent from the foregoing description, according to embodiments, it is possible to effectively select a serving network (e.g., a stand-alone non-public network (SNPN) or a public network integrated non-public network (PNINPN or PLMN) to provide services to a user equipment (UE) considering the information provided from the UE or from the network.

The embodiments herein are provided merely for better understanding of the disclosure, and the disclosure should not be limited thereto or thereby. In other words, it is apparent to one of ordinary skill in the art that various changes may be made thereto without departing from the scope of the disclosure. Further, the embodiments may be practiced in combination. For example, the base station and the UE may be operated in a combination of parts of an embodiment and another embodiment. Embodiments of the disclosure may be applied to other communication systems, and various modifications may be made thereto based on the technical spirit of embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a provisioning server in a wireless communication system, the method comprising:
receiving, from a user equipment (UE), an identifier (ID) list for a stand-alone non-public network (SNPN) associated with system information, an ID of an SNPN where the UE is in an onboarding process, UE location information, and UE type information;
receiving, by the provisioning server from a default credential server (DCS), a candidate serving network list and priority information of the candidate serving network list, wherein the candidate serving network list is selected based on the ID list for the SNPN, the ID of the SNPN where the UE is in the onboarding process, the UE location information, and the UE type information;
selecting, by the provisioning server, an SNPN based on the candidate serving network list and the priority information;
performing, based on the selected SNPN, a provisioning of a credential of a UE;
receiving, from the DCS, contractual relationship information for a network operator who has already been contracted by a manufacturer, wherein the SNPN is selected by the provisioning server based on the candidate serving network list, the priority information, and the contractual relationship information; and
receiving, from the UE, information for the SNPN, the information for the SNPN including signal strength for a radio access network (RAN) and information for cell capacity.

2. The method of claim 1, further comprising:
receiving, from the SNPN, other UE configuration parameters including single-network slice selection assistance information (S-NSSAI), data network name (DNN), UE route selection policies (URSPs), quality of service (QOS) rules, and other required parameters to access the SNPN and establish a regular protocol data unit (PDU) session.

3. The method of claim 2, further comprising:
transmitting, to the UE, the other UE configuration parameters, wherein a PDU session of an onboarding SNPN is released by the UE upon successfully receiving the other UE configuration parameters.

4. The method of claim 1, further comprising:
receiving, from the SNPN, information related to a network credential; and
transmitting, to the UE, the information related to the network credential.

5. A method of a user equipment (UE) in a wireless communication system, the method comprising:
transmitting, to a provisioning server and a default credential server (DCS), an identifier (ID) list for a stand-alone non-public network (SNPN) associated with system information, an ID of an SNPN where the UE is in an onboarding process, UE location information, and UE type information;
registering in an SNPN, the SNPN is selected by a provisioning server based on a candidate serving network list and priority information of the candidate serving network list; and
transmitting, to the provisioning server, information for the SNPN, the information for the SNPN including signal strength for a radio access network (RAN) and information for cell capacity,
wherein the candidate serving network list is selected based on the ID list for the SNPN, the ID of the SNPN where the UE is in the onboarding process, the UE location information, and the UE type information and wherein a credential of the UE is provisioned based on the selected SNPN, and
wherein the SNPN is selected based on the candidate serving network list, the priority information, and contractual relationship information for a network operator who has already been contracted by a manufacturer.

6. The method of claim 5, further comprising:
receiving, from the provisioning server, other UE configuration parameters including single-network slice selection assistance information (S-NSSAI), data network name (DNN), UE route selection policies (URSPs), quality of service (QOS) rules, and other required parameters to access the SNPN and establish a regular protocol data unit (PDU) session; and
releasing a PDU session of an onboarding SNPN upon successfully receiving the other UE configuration parameters.

7. A provisioning server in a wireless communication system, the provisioning server comprising:
a transceiver; and
a controller coupled with the transceiver and configured to control to:
receive, from a user equipment (UE), an identifier (ID) list for a stand-alone non-public network (SNPN) associated with system information, an ID of an SNPN where the UE is in an onboarding process, UE location information, and UE type information;
receive, from a default credential server (DCS), a candidate serving network list and priority information of the candidate serving network list, wherein the candidate serving network list is selected based on the ID list for the SNPN, the ID of the SNPN where the UE is in the onboarding process, the UE location information, and the UE type information;
select an SNPN based on the ID of the candidate serving network list and the priority information;
perform, based on the selected SNPN, a provisioning of a credential of a UE;
receive, from the DCS, contractual relationship information for a network operator who has already been contracted by a manufacturer, wherein the SNPN is selected by the provisioning server based on the candidate serving network list, the priority information, and the contractual relationship information; and
receive, from the UE, information for the SNPN, the information for the SNPN including signal strength for a radio access network (RAN) and information for cell capacity.

8. The provisioning server of claim 7, wherein the controller is further configured to:
receive, from the SNPN, other UE configuration parameters including single-network slice selection assistance information (S-NSSAI), data network name (DNN), UE route selection policies (URSPs), quality of service (QOS) rules, and other required parameters to access the SNPN and establish a regular protocol data unit (PDU) session.

9. The provisioning server of claim 8, wherein the controller is further configured to:
transmit, to the UE, the other UE configuration parameters, wherein a PDU session of an onboarding SNPN is released by the UE upon successfully receiving the other UE configuration parameters.

10. The provisioning server of claim 7, wherein the controller is further configured to:
  receive, from the SNPN, information related to a network credential, and
  transmit, to the UE, the information related to the network credential.

11. A user equipment (UE) in a wireless communication system, the UE comprising:
  a transceiver; and
  a controller coupled with the transceiver and configured to:
    transmit, to a provisioning server and a default credential server (DCS), an identifier (ID) list for a stand-alone non-public network (SNPN) associated with system information, an ID of an SNPN where the UE is in an onboarding process, UE location information, and UE type information;
    register in an SNPN, the SNPN is selected by a provisioning server based on a candidate serving network list and priority information of the candidate serving network list; and
    transmit, to the provisioning server, information for the SNPN, the information for the SNPN including signal strength for a radio access network (RAN) and information for cell capacity,
  wherein the candidate serving network list is selected based on the ID list for the SNPN, the ID of the SNPN where the UE is in the onboarding process, the UE location information, and the UE type information, and
  wherein a credential of the UE is provisioned based on the selected SNPN, and
  wherein the SNPN is selected based on the candidate serving network list, the priority information, and contractual relationship information for a network operator who has already been contracted by a manufacturer.

12. The UE of claim 11, wherein the controller is configured to:
  receive, from the provisioning server, other UE configuration parameters including single-network slice selection assistance information (S-NSSAI), data network name (DNN), UE route selection policies (URSPs), quality of service (QOS) rules, and other required parameters to access the SNPN and establish a regular protocol data unit (PDU) session; and
  release a PDU session of an onboarding SNPN upon successfully receiving the other UE configuration parameters.

* * * * *